United States Patent
Hou et al.

(10) Patent No.: US 10,627,917 B2
(45) Date of Patent: Apr. 21, 2020

(54) OBJECT-SENSING APPARATUS AND OBJECT-SENSING METHOD

(71) Applicant: Wistron Corporation, New Taipei (TW)

(72) Inventors: Chia-Chang Hou, New Taipei (TW); Yu-Yen Chen, New Taipei (TW); Po-Liang Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 277 days.

(21) Appl. No.: 14/740,289

(22) Filed: Jun. 16, 2015

(65) Prior Publication Data
US 2016/0259428 A1 Sep. 8, 2016

(30) Foreign Application Priority Data
Mar. 3, 2015 (TW) .............................. 104106646 A (51) Int. Cl.
G06F 3/03 (2006.01)
G06F 3/01 (2006.01)
G06F 1/16 (2006.01)

(52) U.S. Cl.
CPC ............ *G06F 3/0325* (2013.01); *G06F 1/169* (2013.01); *G06F 1/1616* (2013.01); *G06F 3/017* (2013.01)

(58) Field of Classification Search
CPC .................................. G06F 3/017; G06F 3/011
See application file for complete search history.

(56) References Cited

U.S. PATENT DOCUMENTS

| | | | |
|---|---|---|---|
| 9,317,198 B2 | 4/2016 | Kwak et al. |
| 9,395,820 B2 | 7/2016 | Okuley |
| 9,864,435 B2 | 1/2018 | Okuley |
| 2010/0141963 A1 | 6/2010 | Hsu et al. |

(Continued)

FOREIGN PATENT DOCUMENTS

| | | |
|---|---|---|
| CN | 103729054 | 4/2014 |
| TW | 201118690 | 6/2011 |
| TW | 201337511 | 9/2013 |

OTHER PUBLICATIONS

"Office Action of Taiwan Counterpart Application" with partial English translation, dated Apr. 26, 2016, p. 1-p. 12.

(Continued)

*Primary Examiner* — Amare Mengistu
*Assistant Examiner* — Shawna T Stepp Jones
(74) *Attorney, Agent, or Firm* — JCIPRNET (57) ABSTRACT

An object-sensing apparatus and an object-sensing method are provided. The object-sensing apparatus includes a processing unit, a first body having a first depth recognition module and a second body having a second depth recognition module. A sensing range of the first depth recognition module covers at least a part of the second body. A sensing range of the second depth recognition module covers at least a part of the first body. The sensing ranges of the first and the second depth recognition modules form a virtual sensing space, and the first and the second depth recognition modules generate a plurality of pieces of location information by sensing an object in the virtual sensing space. The processing unit generates spatial location information of the object in the virtual sensing space according to the plurality of pieces of location information.

8 Claims, 5 Drawing Sheets

(56) References Cited

U.S. PATENT DOCUMENTS

| | | | |
|---|---|---|---|
| 2012/0235903 A1* | 9/2012 | Im | G06F 3/005 |
| | | | 345/158 |
| 2014/0101578 A1* | 4/2014 | Kwak | G06F 3/017 |
| | | | 715/761 |
| 2015/0020034 A1* | 1/2015 | Okuley | G06F 1/1616 |
| | | | 715/863 |
| 2017/0160809 A1 | 6/2017 | Okuley | |

OTHER PUBLICATIONS

"Office Action of China Counterpart Application," dated Apr. 25, 2018, p. 1-p. 10.

* cited by examiner

OBJECT-SENSING APPARATUS AND OBJECT-SENSING METHOD

CROSS-REFERENCE TO RELATED APPLICATION

This application claims the priority benefit of Taiwan application serial no. 104106646, filed on Mar. 3, 2015. The entirety of the above-mentioned patent application is hereby incorporated by reference herein and made a part of this specification.

BACKGROUND OF THE INVENTION

Field of the Invention

The invention relates to a sensing technology of electronic devices, and in particular, an object-sensing apparatus and an object-sensing method for generating a virtual sensing space to precisely sense a location of an object.

Description of Related Art

The interface for human-machine interaction of consumer electronic devices is usually the mouse, the keyboard, or the joystick. As the technology develops and advances, touch devices and motion-sensing apparatuses have recently been widely used as human-machine interface in various electronic devices. Giving a stronger human touch to human-machine interaction, motion-sensing apparatuses provide a brand-new non-contact human-machine interaction system (namely, a three-dimensional interaction system). Compared to conventional interaction interfaces or two-dimensional touch devices, three-dimensional interaction systems offer kinetic operations that are closer to daily experience and behavior of the user, thus creating better operational experience in the user.

In a three-dimensional interaction system, a single depth recognition module is usually used to determine a motion or location information of an object within a sensing range thereof. Thereby, three-dimensional interaction systems execute corresponding operations according to the motion of the user within the sensing range to achieve the purpose of spatial 3D interaction.

However, since the user does not know the exact sensing range of the depth recognition module having two lenses, she/he can only determine the sensing range by experience or according to a distance between the hand of the user and the depth recognition module. Therefore, when the user's hand is overly close to the depth recognition module or is not within the sensing range, the three-dimensional interaction system cannot be operated. In other words, since the user does not know the exact sensing range of the depth recognition module, the motion of the user easily exceeds the range that can be sensed by the depth recognition module, which causes inconvenience in use.

SUMMARY OF THE INVENTION

The invention provides an object-sensing apparatus and an object-sensing method for generating a virtual sensing space having a size corresponding to bodies of the apparatus, such that a user is allowed to determine with ease the virtual sensing space based on the bodies of the apparatus and thereby precisely utilize an object-sensing function.

The invention provides an object-sensing apparatus including a first body having a first depth recognition module, a second body having a second depth recognition module, and a processing unit. A first side of the second body is connected to a first side of the first body, and the first depth recognition module is provided at a second side in the first body opposite to the first side of the first body, wherein a sensing range of the first depth recognition module covers at least a part of the second body. The second depth recognition module is provided at a second side in the second body opposite to the first side of the second body, wherein a sensing range of the second depth recognition module covers at least a part of the first body. The sensing ranges of the first depth recognition module and the second depth recognition module intersect to form a virtual sensing space, and the first depth recognition module and the second depth recognition module sense an object in the virtual sensing space to generate a plurality of pieces of location information comprising depth. The processing unit is coupled to the first depth recognition module and the second depth recognition module to receive the plurality of pieces of location information and generate spatial location information of the object in the virtual sensing space according to the plurality of pieces of location information.

From another perspective, the invention provides an object-sensing method for the above-described object-sensing apparatus. The object-sensing method includes forming a virtual sensing space according to sensing ranges of the first depth recognition module and second depth recognition module, and generating spatial location information of an object in the virtual sensing space according to a plurality of pieces of location information generated by the first and second depth recognition modules sensing the object in the virtual sensing space.

In light of the above, the object-sensing apparatus as described in the embodiments of the invention includes a plurality of depth recognition modules. By providing the depth recognition modules at specific positions of the first body and the second body in the object-sensing apparatus, the user is allowed to determine with ease the virtual sensing space based on the bodies of the apparatus. Accordingly, based on the bodies of the apparatus, the user knows whether she/he is sensed by the depth recognition modules and thereby precisely utilizes the object-sensing function in the object-sensing apparatus.

To provide a further understanding of the aforementioned and other features and advantages of the invention, exemplary embodiments, together with the reference drawings, are described in detail below.

DESCRIPTION OF THE EMBODIMENTS

The present embodiment of the invention provides an object-sensing apparatus and an object-sensing method. In the object-sensing apparatus, at least two depth recognition modules are provided at specific positions of two bodies. A virtual sensing space is formed by an intersection of sensing ranges of the depth recognition modules, such that a user is able to determine an exact range and size of the virtual sensing space according to the bodies of the object-sensing apparatus. In addition, the object-sensing apparatus effectively detects location information of any location of the user in the virtual sensing space.

Figure 1:
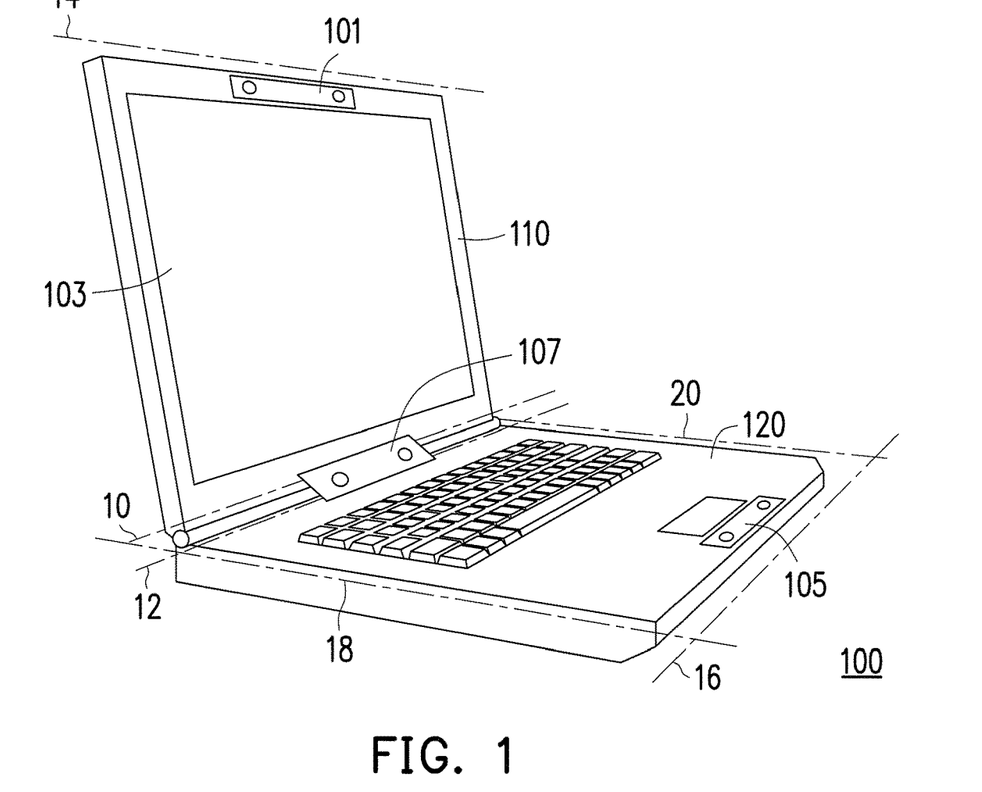
FIG. 1 is a schematic view of an object-sensing apparatus illustrated according to one embodiment of the invention.

FIG. 1 is a schematic view of an object-sensing apparatus illustrated according to one embodiment of the invention. In the present embodiment, the object-sensing apparatus is a laptop 100. However, note that the invention is not limited thereto. In another embodiment of the invention, the object-sensing apparatus is any apparatus wherein the virtual sensing space as described in the invention is generated by at least two depth recognition modules respectively provided on two bodies or planes.

Referring to FIG. 1, the laptop 100 includes a first body 110 and a second body 120. The first body 110 connects a first side 10 of the first body 110 with a first side 12 of the second body 120 through a pivot joint (not illustrated), and the first body 110 and the second body 120 may be in an open state or a close state through the pivot joint.

The first body 110 includes a first depth recognition module 101 and a display unit 103. The second body 120 includes a second depth recognition module 105 and a processing unit (not illustrated). In the present embodiment, the laptop 100 further includes a third depth recognition module 107 provided at or near the pivot joint (namely, a connection portion).

The first depth recognition module 101, the second depth recognition module 105, the third depth recognition module 107, and the display unit 103 are respectively coupled to the processing unit in the second body 120. The processing unit is configured to accomplish the object-sensing method as described in the invention and correspondingly display a result in a display image of the display unit 103. In the present embodiment, the processing unit is a Central Processing Unit (CPU). However, the invention is not limited thereto. The processing unit may be a Graphics Processing Unit (GPU), for example, or other programmable devices such as a Microprocessor. Moreover, in the present embodiment, the display unit 103 is a flat panel display. However, in another embodiment, the display unit 103 is any type of display device, such as a projection display, a flexible display, a Liquid Crystal Display (LCD), or a Light Emitting Diode Display (LED Display). In addition, in the present embodiment, the first depth recognition module 101, the second depth recognition module 105, and the third depth recognition module 107 are depth cameras having twin lenses. However, in another embodiment, the first depth recognition module 101, the second depth recognition module 105, and the third depth recognition module 107 are stereo cameras having multiple lenses, a combination of a plurality of cameras for constructing 3D images, or other image-sensing devices for detecting 3D spatial information.

The first depth recognition module 101 is provided at a second side 14 in the first body 110 opposite to the first side 10 of the first body 110. An effective sensing range of the first depth recognition module 101 preferably covers the second body 120 (or at least covering most of the second body 120) for sensing location information including depth of an object within the effective sensing range.

The second depth recognition module 105 is provided at a second side 16 in the second body 120 opposite to the first side 12 of the second body 120. An effective sensing range of the second depth recognition module 105 preferably covers the first body 110 (or at least covering most of the first body 110) for sensing location information including depth of an object within the effective sensing range.

The third depth recognition module 107 is provided at or near the pivot joint of the laptop 100 (for example, at the first side of the second body 120 or at the first side of the first body 110). An effective sensing range of the third depth recognition module 107 may not cover the first body 110 and the second body 120 (but may cover part of the first body 110 and the second body 120 in other embodiments) for sensing location information including depth of an object within the effective sensing range.

In the object-sensing apparatus of the invention, a virtual sensing space is formed by an intersection of the sensing ranges of the first depth recognition module 101, the second depth recognition module 105, and the third depth recognition module 107. A user determines with ease a range of the virtual sensing space according to the bodies of the object-sensing apparatus. The first depth recognition module 101, the second depth recognition module 105, and the third depth recognition module 107 respectively sense an object (e.g., a finger of the user) in the virtual sensing space to generate a plurality of pieces of location information. After receiving such location information, the processing unit generates spatial location information of the object in the virtual sensing space and generates a piece of object spatial location information corresponding to a content in a displayed image of the display unit 103 for executing an operation corresponding to the content in the displayed image.

Figure 2:
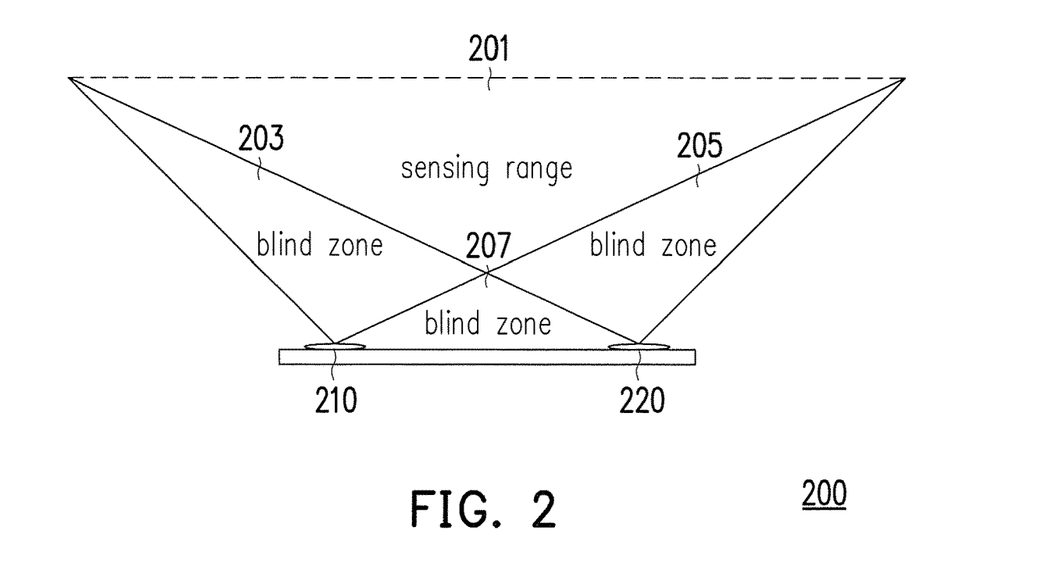
FIG. 2 is a schematic view of an effective sensing range and blind zones of a conventional depth recognition module illustrated according to one embodiment of the invention.

FIG. 2 is a schematic view of an effective sensing range and blind zones of a conventional depth recognition module illustrated according to one embodiment of the invention.

Referring to FIG. 2, the conventional depth recognition module 200 has two lenses, including a lens 210 and a lens 220. An effectively sensing range 201 of the depth recognition module 200 is a region intersected by view ranges of the lens 210 and the lens 220. Other regions outside the sensing range 201 of the lens 210 and the lens 220, such as blind zones 203, 205, and 207, are regions that cannot be correctly sensed or cannot be sensed by the depth recognition module 200.

FIG. 3A to FIG. 3F are schematic views of a sensing range of a provided depth recognition module illustrated according to one embodiment of the invention. Note that FIG. 3A to FIG. 3F are two-dimensional schematic views meant for facilitating description of the invention instead of limiting the invention.

Figure 3A:
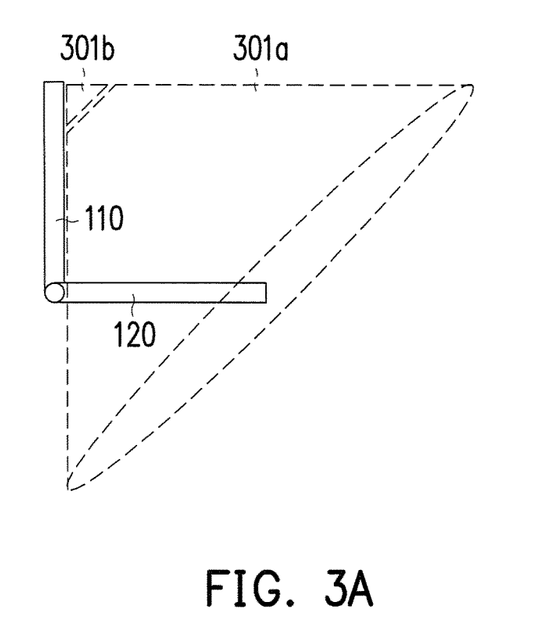
FIG. 3A to FIG. 3F are schematic views of a sensing range of a provided depth recognition module illustrated according to one embodiment of the invention.
Figure 3B:
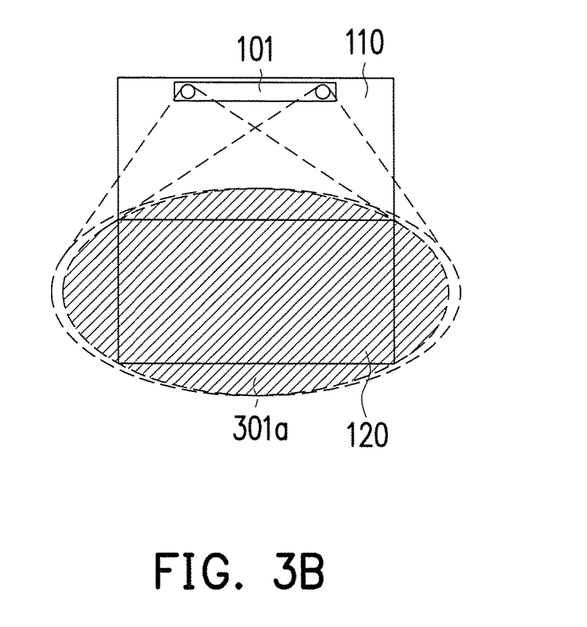

Referring to FIG. 3A and FIG. 3B, FIG. 3A is a side view of the sensing range of the first depth recognition module 101 and FIG. 3B is a top view of the sensing range of the first depth recognition module 101. A sensing range 301a of the first depth recognition module 101 is an effective sensing region, while a blind zone 301b is an ineffective sensing region. The sensing range 301a of the first depth recognition module 101 covers the second body 120, as illustrated in FIG. 3A and FIG. 3B. In particular, note that to emphasize a difference between the blind zones and the sensing range 301a, in FIG. 3B, the sensing range 301a of the first depth recognition module 101 is slightly downsized. However, the sensing range 301a in FIG. 3B is for illustrative purposes only. The actual sensing range 301a shall be larger than the blind zones, and the sensing range 301a of the first depth recognition module 101 covers the second body 120. Sensing ranges 302a and 303a in FIG. 3D and FIG. 3F are also for illustrative purposes only. The actual sensing range 302a and 303a shall be larger than the blind zones.

Figure 3C:
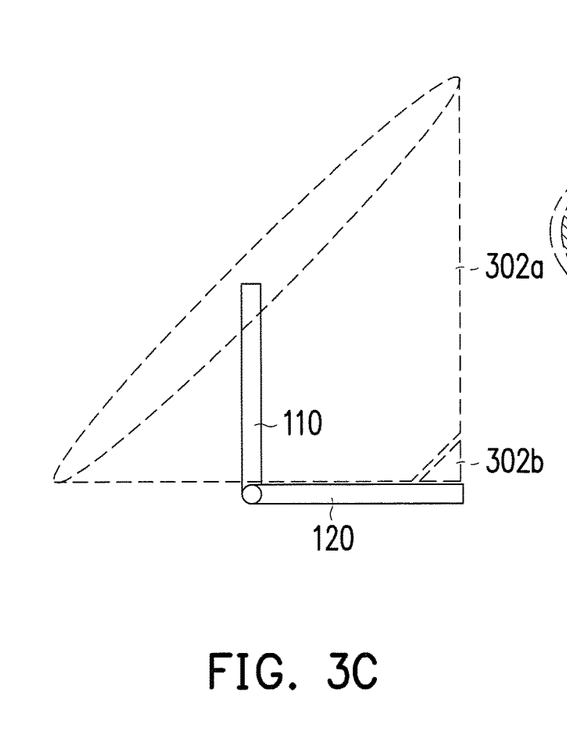
Figure 3D:
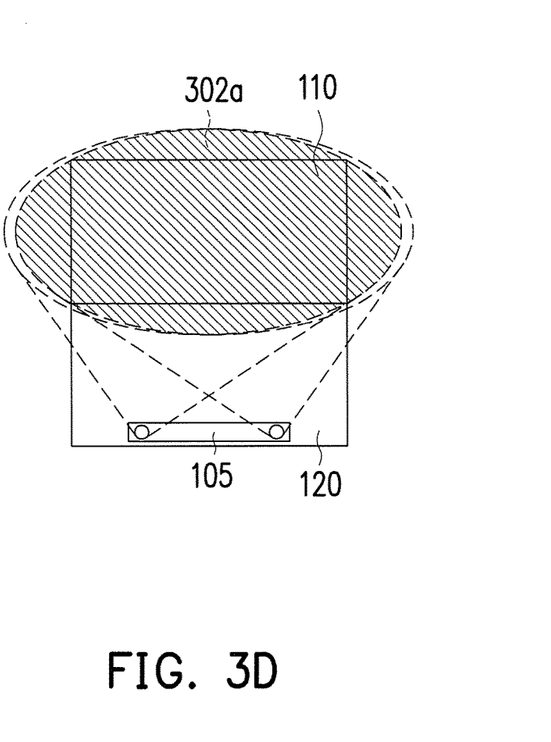

Referring to FIG. 3C and FIG. 3D, FIG. 3C is a side view of the sensing range of the second depth recognition module 105 and FIG. 3D is a top view of the sensing range of the second depth recognition module 105. A sensing range 302a of the second depth recognition module 105 is an effective sensing region, while a blind zone 302b is an ineffective sensing region. The sensing range 302a of the second depth recognition module 105 covers the first body 110, as illustrated in FIG. 3C and FIG. 3D. Note that the sensing range 302a of the second depth recognition module 105 in FIG. 3D is for illustrative purposes only. The sensing range 302a of the second depth recognition module 105 covers the first body 110.

As shown in FIG. 3A and FIG. 3C, the blind zone 301b of the first depth recognition module 101 is within the sensing range 302a of the second depth recognition module 105, and the blind zone 302b of the second depth recognition module 105 is within the sensing range 301a of the first depth recognition module 101. In other words, by configuring the first depth recognition module 101 and the second depth recognition module 105, any location in the virtual sensing space of the invention is located in the effective sensing range of one of the first depth recognition module 101 and the second depth recognition module 105, such that any location of an object in the virtual sensing space is sensed for generating location information.

Figure 3E:
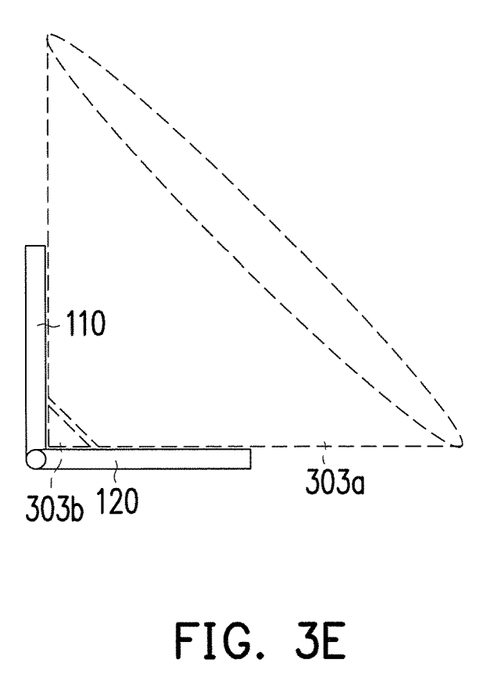
Figure 3F:
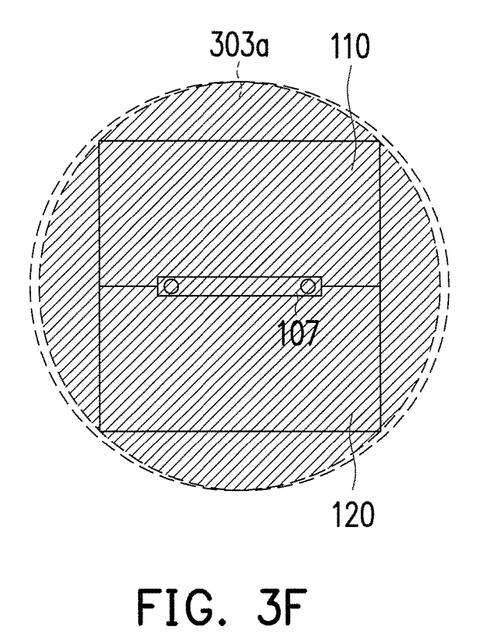

Referring to FIG. 3E and FIG. 3F, FIG. 3E is a side view of the sensing range of the third depth recognition module 107 and FIG. 3F is a top view of the sensing range of the third depth recognition module 107. A sensing range 303a of the third depth recognition module 107 is an effective sensing region, while a blind zone 303b is an ineffective sensing region. The sensing range 303a of the third depth recognition module 107 does not cover the first body 110 and the second body 120, as illustrated in FIG. 3E and FIG. 3F. Note that the sensing range 303a of the third depth recognition module 107 in FIG. 3F is for illustrative purposes only. The sensing range 303a of the third depth recognition module 107 does not cover the first body 110 and the second body 120.

In the present exemplary embodiment, the third depth recognition module 107 is provided to work with the first depth recognition module 101 and the second depth recognition module 105 for enhancing precision of sensing an object location in the virtual sensing space. In addition, when one of the first depth recognition module 101, the second depth recognition module 105, and the third depth recognition module 107 cannot sense an object in the virtual sensing space (namely, when the object is in the blind zone of one of the first depth recognition module 101, the second depth recognition module 105, and the third depth recognition module 107), the processing unit generates spatial location information of the object according to the pieces of location information sensed by the other two of the first depth recognition module 101, the second depth recognition module 105, and the third depth recognition module 107. Alternatively, the processing unit pre-sets depth recognition modules which correspondingly sensing the blind zone of the other depth recognition modules for each blind zones of each depth recognition module, and conduct sensing by the pre-set depth recognition modules for the blind zone. Accordingly, precision of object sensing is more effectively enhanced by providing three depth recognition modules.

Figure 4A:
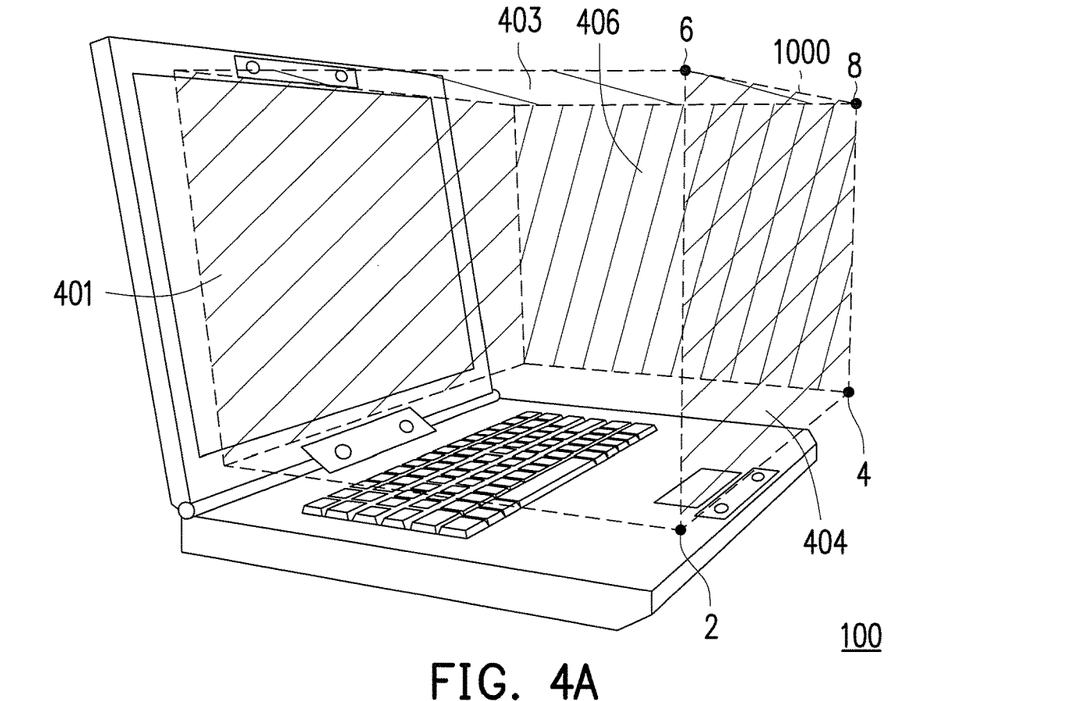
FIG. 4A to FIG. 4B are schematic views of a virtual sensing space illustrated according to one embodiment of the invention.
Figure 4B:
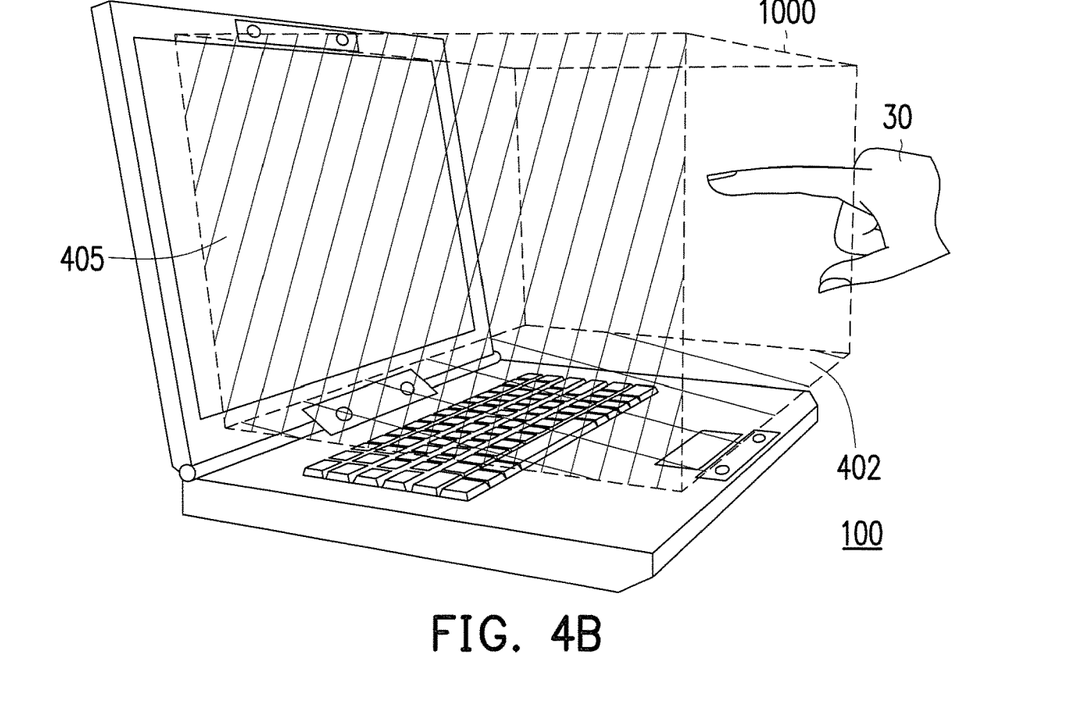

FIG. 4A to FIG. 4B are schematic views of a virtual sensing space illustrated according to one embodiment of the invention.

Referring to FIG. 1 and FIG. 4A to FIG. 4B simultaneously, a range formed by broken lines in FIG. 4A and FIG. 4B is a virtual sensing space 1000 formed by an intersection of the sensing ranges of the first depth recognition module 101, the second depth recognition module 105, and the third depth recognition module 107. To facilitate understanding, FIG. 4A and FIG. 4B separately illustrate and mark a first virtual plane 401 to a sixth virtual plane 406 in the virtual sensing space 1000, wherein FIG. 4A only illustrates the first virtual plane 401, the third virtual plane 403, the fourth virtual plane 404, and the sixth virtual plane 406 in the virtual sensing space 1000, and FIG. 4B only illustrates the second virtual plane 402 and the fifth virtual plane 405 in the virtual sensing space 1000. A person applying the present embodiment shall be able to understand the locations of the virtual planes 401 to 406 from FIG. 4A to FIG. 4B. In the present embodiment, the range of the virtual sensing space 1000 is within a space enclosed by a first virtual plane 401, a second virtual plane 402, a third virtual plane 403, and a fourth virtual plane 404. The first virtual plane 401 refers to the plane of the first body 110 at which the first depth recognition module 101 is provided; the second virtual plane 402 refers to the plane of the second body 120 at which the second depth recognition module 105 is provided; the third virtual plane 403 refers to a plane parallel to the second body 120 and passing the second side 14 of the first body 110; the fourth virtual plane 404 refers to a plane vertical to the second body 120 and passing the second side 16 of the second body 120.

Specifically speaking, when the laptop 100 is in the open state (namely, when the first body 110 and the second body 120 form an angle), the processing unit adjusts projection angles of the first depth recognition module 101, the second depth recognition module 105, and the third depth recognition module 107 according to the opening angle of the laptop 100, so as to achieve the above-described state where the effective sensing range of the first depth recognition module 101 covers the second body 120, the effective sensing range of the second depth recognition module 105 covers the first body 110, and the sensing range of the third depth recognition module 107 does not cover the first body 110. In other words, a height of the virtual sensing space 1000 varies correspondingly along with different opening angles of the first body 110 relative to the second body 120. The opening angle of the laptop 100 is measured mechanically or by a G-sensor provided in the first body 110.

Next, a vertex 6 and a vertex 8 of the virtual sensing space 1000 are defined according to the sensing ranges of the first depth recognition module 101, the second depth recognition module 105, and the third depth recognition module 107. The vertex 6 and the vertex 8 are both within each of the sensing ranges of the first depth recognition module 101, the second depth recognition module 105, and the third depth recognition module 107. The vertex 6 and the vertex 8 are respectively two points formed by extending a vertex 2 and a vertex 4 defining the second body 120 toward a normal direction vertical to the second body 120 and intersecting the vertices 2 and 4 with the third virtual plane 403, thereby respectively forming a fifth virtual plane 405 and a sixth virtual plane 406 vertical to the second virtual plane 402 and the fourth virtual plane 404. The vertex 2 is defined as an intersecting point between a third side 18 of the second body 120 and the fourth virtual plane 404; the vertex 4 is defined as an intersecting point between a fourth side 20 of the second body 120 and the fourth virtual plane 404. Through the first to sixth virtual planes, a rectangle- or wedge-shaped three-dimensional space block is defined on the laptop 100, and the processing unit adjusts the effective sensing ranges of the first depth recognition module 101, the second depth recognition module 105, and the third depth recognition module 107, such that the three-dimensional space is formed into the virtual sensing space 1000 as illustrated in FIG. 4A and FIG. 4B. In other words, as illustrated in FIG. 4B, by defining the virtual sensing space 1000, a user 30 knows the exact effective range and size of the virtual sensing space 1000 based on the first body 110 and the second body 120. In addition, the processing unit senses location information of the user 30 according to the first depth recognition module 101, the second depth recognition module 105, and the third depth recognition module 107, respectively, and generates a piece of spatial location information using a triangulation method according to fixed positions of the first depth recognition module 101, the second depth recognition module 105, and the third depth recognition module 107 and the pieces of location information thereof, so as to correspondingly operate a content in the displayed image of the display unit 103. The aforementioned triangulation method is prior art of people skilled in the art and will not be detailed here.

Figure 5:
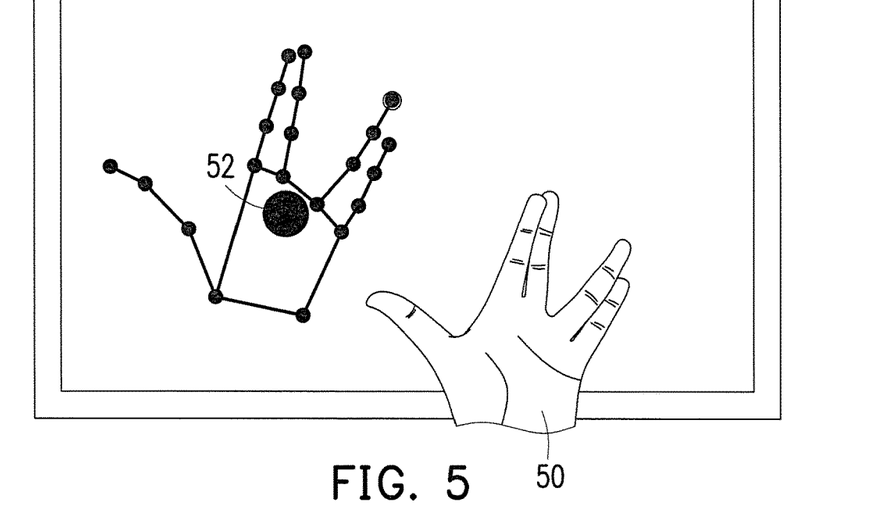
FIG. 5 is a schematic view of an application of an object-sensing method illustrated according to one embodiment of the invention.

FIG. 5 is a schematic view of an application of an object-sensing method illustrated according to one embodiment of the invention.

Referring to FIG. 5, in the present embodiment, when a hand 50 of the user is in the virtual sensing space of the object-sensing apparatus of the invention, the processing unit converts a plurality of pieces of location information sensed by the first, second, and third depth recognition modules into a piece of object spatial location information, correspondingly outputs an object coordinate 52 in the displayed image of the display unit, and converts the fingers into a corresponding skeleton. If a distance between the object coordinate 52 and an object coordinate of a user interface object in the displayed image is 0, the processing unit reads that the user touches the object. Moreover, when the processing unit reads that the user touches the object, if a distance between skeleton points of at least two fingers and the object is 0, the processing unit reads that the user grabs the object. If the hand moves at this time, the object in the displayed image moves along with the skeleton and the object coordinate 52. If the object in the displayed image moves along with the skeleton and the object coordinate 52, when a linear distance between the two skeleton points touching the object is larger than a size of the object, the processing unit reads that the user lets go of the object. At this time, the object stops moving along with the object coordinate 52. However, the invention is not limited thereto. The utilization of the object-sensing apparatus of the invention further includes other applications.

Figure 6:
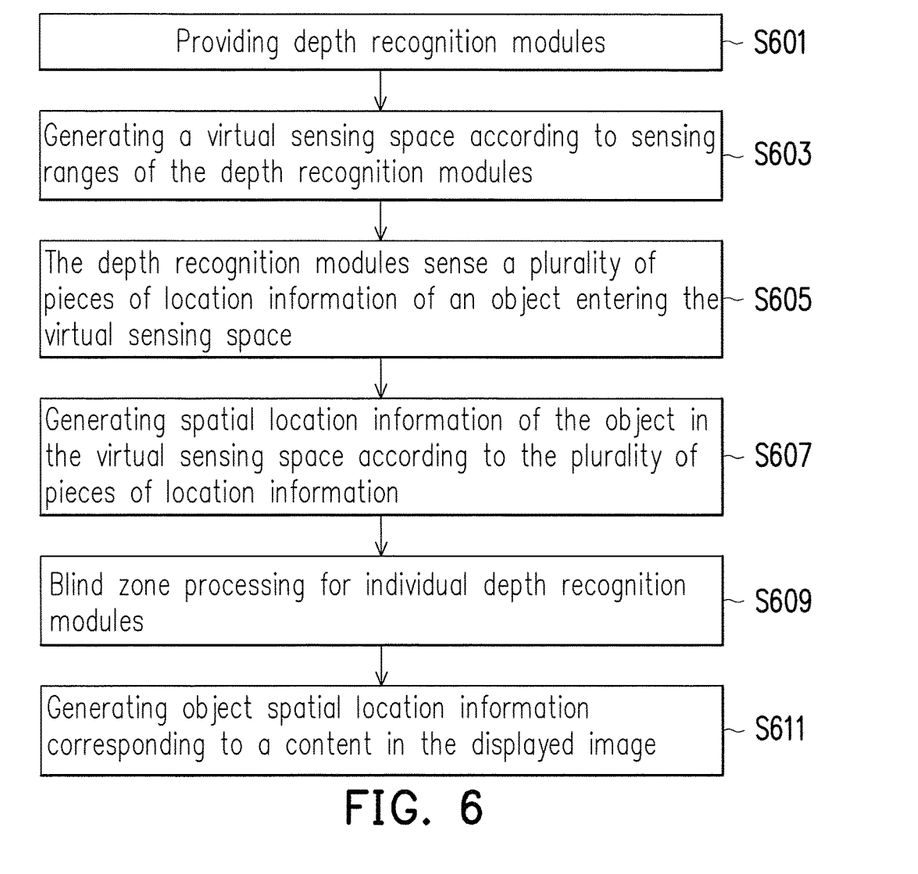
FIG. 6 is a flowchart for the object-sensing method illustrated according to one embodiment of the invention.

FIG. 6 is a flowchart for the object-sensing method illustrated according to one embodiment of the invention.

Referring to FIG. 6, in a step S601, according to the configuration of the above-described object-sensing apparatus of the invention, a first depth recognition module, a second depth recognition module, and a third depth recognition module are provided. In a step S603, the object-sensing apparatus generates a virtual sensing space according to sensing ranges of the first depth recognition module, the second depth recognition module, and the third depth recognition module. In a step S605, the first depth recognition module, the second depth recognition module, and the third depth recognition module respectively sense an object entering the virtual sensing space to generate a plurality of pieces of location information of the object. In a step S607, a processing unit generates spatial location information of the object in the virtual sensing space according to the plurality of pieces of location information. In a step S609, when the object is in a blind zone of one of the first depth recognition module, the second depth recognition module, and the third depth recognition module, conducting blind zone processing for individual depth recognition modules. Lastly, in a step S611, the processing unit generates a piece of object spatial location information in a displayed image corresponding to a content in the displayed image.

In summary of the above, the object-sensing apparatus as described in the embodiments of the invention includes a plurality of depth recognition modules. By providing the depth recognition modules at specific positions of the first body and the second body of the object-sensing apparatus, the user is allowed to determine with ease the virtual sensing space based on the bodies of the apparatus. Accordingly, based on the bodies of the apparatus, the user knows whether she/he is sensed by the depth recognition modules and thereby precisely utilizes the object-sensing function in the object-sensing apparatus.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An object-sensing apparatus, comprising:
a first body and a second body, wherein a first side of the second body is connected to a first side of the first body;
a first depth recognition module provided at a second side in the first body opposite to the first side of the first body, wherein a sensing range of the first depth recognition module covers at least a part of the second body;
a second depth recognition module provided at a second side in the second body opposite to the first side of the second body, wherein a sensing range of the second depth recognition module covers at least a part of the first body;
a third depth recognition module that is provided at or near a connection portion of the first side of the first body and the first side of the second body; and
a processing unit coupled to the first depth recognition module, the second depth recognition module and the third depth recognition module to determine whether an object enters a virtual sensing space, receive a plurality of pieces of location information comprising depth of the object respectively sensed by the first depth recognition module, the second depth recognition module and the third depth recognition module and generate a piece of spatial location information of the object in the virtual sensing space according to the plurality of pieces of location information when the object enters the virtual sensing space,
wherein the sensing ranges of the first, second, and third depth recognition modules intersect to form the virtual sensing space,
wherein the virtual sensing space is defined as a space formed by a first virtual plane formed by the first body, a second virtual plane formed by the second body, a third virtual plane parallel to the second body and passing the second side of the first body, and a fourth virtual plane vertical to the second body and passing the second side of the second body, wherein the processing unit pre-sets information of blind zones for each of the first, second, and third depth recognition modules and the information of blind zones includes that each of the blind zones is able to be sensed by which one of the first, second, and third depth recognition modules, when one of the first, second, and third depth recognition modules is unable to correctly sense the object, the other two of the first, second, and third depth recognition modules sense the object according to the information of blind zones.

2. The object-sensing apparatus according to claim 1, wherein the first body further comprises a display unit coupled to the processing unit for displaying an image and the processing unit generates a piece of object spatial location information corresponding to a content of the displayed image according to the spatial location information.

3. The object-sensing apparatus according to claim 1, wherein the processing unit generates the spatial location information of the object according to fixed positions of the first, second, and third depth recognition modules and the plurality of pieces of location information by a triangulation method.

4. The object-sensing apparatus according to claim 1, wherein any one of the first, second, and third depth recognition modules comprises two image capturing units for sensing the plurality of pieces of location information comprising depth of the object.

5. An object-sensing method for an apparatus comprising a first body and a second body, the object-sensing method comprising:
   defining a virtual sensing space according to an intersection of sensing ranges of a first depth recognition module, a second depth recognition module and a third depth recognition module, wherein a first side of the second body is connected to a first side of the first body, the first depth recognition module is provided at a second side in the first body opposite to the first side of the first body, and a sensing range of the first depth recognition module covers at least a part of the second body, wherein the second depth recognition module is provided at a second side in the second body opposite to the first side of the second body, and a sensing range of the second depth recognition module covers at least a part of the first body, and wherein the third depth recognition module is provided at or near a connection portion of the first side of the first body and the first side of the second body;
   determining whether an object enters the virtual sensing space;
   receiving a plurality of pieces of location information comprising depth of the object respectively sensed by the first, second and third depth recognition modules and generating a piece of spatial location information of the object in the virtual sensing space according to the plurality of pieces of location information comprising depth when the object enters the virtual sensing space;
   pre-setting information of blind zones for each of the first, second, and third depth recognition modules and the information of blind zones includes that each of the blind zones is able to be sensed by which one of the first, second, and third depth recognition modules,
   when one of the first, second, and third depth recognition modules is unable to correctly sense the object, the other two of the first, second, and third depth recognition modules sense the object according to the information of blind zones,
   wherein the virtual sensing space is further defined as a space formed by a first virtual plane formed by the first body, a second virtual plane formed by the second body, a third virtual plane parallel to the second body and passing the second side of the first body, and a fourth virtual plane vertical to the second body and passing the second side of the second body.

6. The object-sensing method according to claim 5, wherein the first body further comprises a display unit coupled to the processing unit for displaying an image and the processing unit generates a piece of object spatial location information corresponding to a content of the displayed image according to the spatial location information.

7. The object-sensing method according to claim 5, wherein the method for generating the spatial location information of the object in the virtual sensing space comprises generating the spatial location information by a triangulation method and according to fixed positions of the first, second, and third depth recognition modules and the plurality of pieces of location information.

8. The object-sensing method according to claim 5, wherein any one of the first, second, and third depth recognition modules comprises two image capturing units for sensing the plurality of pieces of location information comprising depth of the object.

* * * * *